United States Patent

[11] 3,574,410

| [72] | Inventor | Karl Buschor |
| | | St. Gallen, Switzerland |
| [21] | Appl. No. | 821,712 |
| [22] | Filed | May 5, 1969 |
| [45] | Patented | Apr. 13, 1971 |
| [73] | Assignee | Gema AG Apparatebau |
| | | St. Gallen, Switzerland |
| [32] | Priority | May 6, 1968 |
| [33] | | Austria |
| [31] | | 8A4319/68 |

[54] PNEUMATIC CONVEYER SYSTEM
9 Claims, 3 Drawing Figs.

| [52] | U.S. Cl. | 302/28 |
| [51] | Int. Cl. | B65g 53/04 |
| [50] | Field of Search | 302/28, 40, 51 |

[56] References Cited
UNITED STATES PATENTS

| 1,566,325 | 12/1925 | Hansen | 302/40 |
| 2,584,378 | 2/1952 | Beam | 302/51 |
| 3,490,654 | 1/1970 | Fischer | 302/28 |
| 3,504,945 | 4/1970 | Leibundgut et al. | 302/51 |

*Primary Examiner*—Andres H. Nielsen
*Attorney*—Karl W. Flocks

ABSTRACT: A pneumatic conveyor system particularly intended for feeding pulverulent and granular coating materials to electrostatic spraying devices. The coating material is supplied from a loading hopper and a distributing chamber to a plurality of diffusors to which a propellant gas is supplied. The diffusors are arranged circumferentially about the distributing chamber and each diffusor is connected to a separate conveyor line leading to an individual spraying device for simultaneous operation of a plurality of spraying devices.

PATENTED APR 13 1971 3,574,410

INVENTOR.
Karl Buschor
BY
Attorney

PNEUMATIC CONVEYER SYSTEM

This invention relates to pneumatic conveyor systems, particularly for powder-spraying apparatus, in which powder material is supplied from a loading hopper and blown through the conveyor line by means of a propellant gas stream fed into the line by diffusor means, and which comprises an inlet duct arranged to supply material from said loading hopper into said conveyor line and opening into said diffusor means at a region of substantial vacuum, a second duct also opening into said diffusor means at said region of substantial vacuum and arranged to supply an additional control gas stream into said region, and means for controlling the supply of control gas through said second duct. A pneumatic conveyor system of controllable conveying capacity for loose flowable pulverulent or granular material of this type is disclosed in U. S. Pat. No. 3,504,945.

In the conveyor system described in said earlier application, the opening of said second duct into said diffusor means is directed in opposition to the opening of said inlet duct of said loading hopper into said diffusor means. In order to regulate said control gas stream, either the inside diameter of the opening of said second duct into the diffusor means is adjustable or is constructed as a nozzle and is connected to a pressure gasline via a control valve.

A powder-spraying apparatus equipped with this conveyor system consists of the spray gun proper, which is connected to the diffusor means via a conveyor line, of a hopper from which the diffusor is fed with powder, and of the means for controlling the control gas stream. In larger powder-spraying apparatus for coating large objects, pulverous material is sprayed simultaneously from a plurality of guns. If the conveyor means according to said earlier application is used in such apparatus, a corresponding number of complete spraying devices is required. This is not only expensive but also interferes with the working methods, since for example, if there is to be a change of coating material, a comparatively large amount of time is necessary for cleaning the individual components.

The invention has for its object to further improve the pneumatic conveying system of the type disclosed in said earlier application to provide for adjustable conveying capacity and make such system suitable for larger powder-spraying apparatus while avoiding the above-mentioned disadvantages.

The conveyor system according to this invention comprises a distributor chamber forming the lower end of said loading hopper, a plurality of diffusor means communicating with said distributor chamber and a separate conveyor line connected to each diffusor means, said second duct being connected with the respective diffusor means by a pipe connection having its axis inclined with respect to the axis of said distributor chamber at an angle of less than 90°.

An embodiment of the invention is shown in the accompanying drawings, in which.

In the embodiment shown, the truncated end 5 of a hopper opens into a cylindrical distributor chamber 6, whose base is constructed as a flap 16, so that emptying and cleaning is easily carried out.

Figure 1:
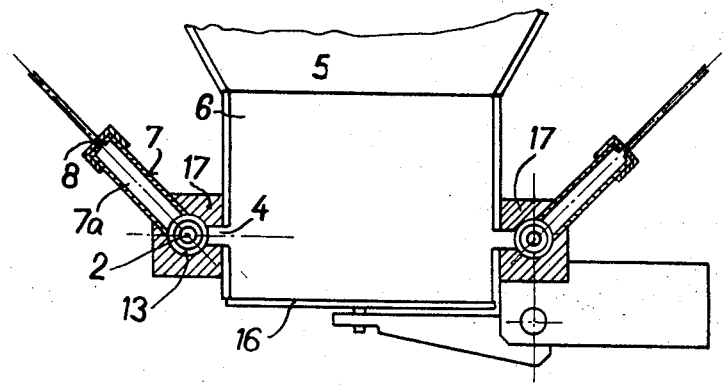
FIG. 1 is a vertical section through the conveyor means shown in FIG. 2.
Figure 2:
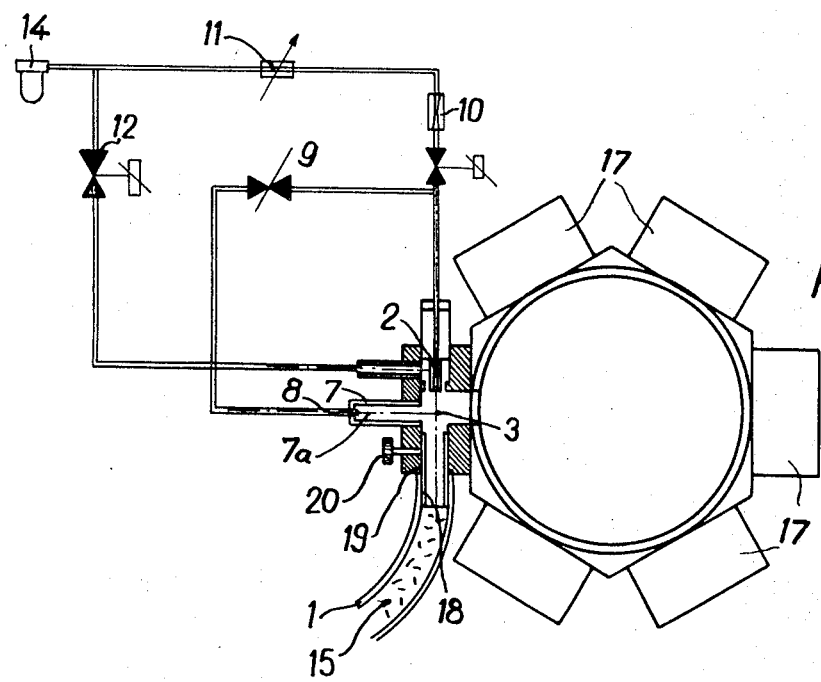
FIG. 2 shows a plan view of a pneumatic conveyor means, a diffusor being shown therein in horizontal section.
Figure 3:
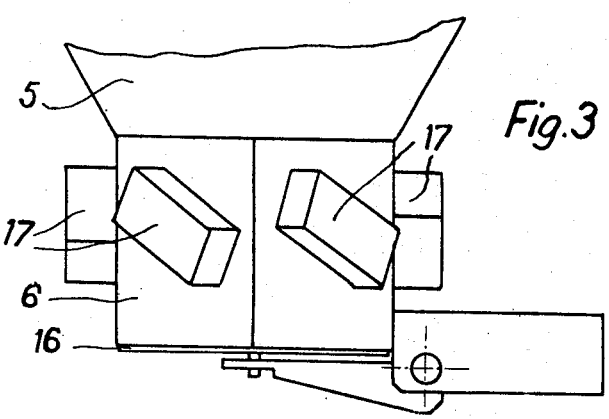
FIG. 3 is a side view thereof.

As FIG. 2 shows, six diffusors 17 are arranged on the outside of the casing of the distributor chamber 6. The inlets 4 to the individual diffusors 17 lie in a plane which is vertical with respect to the axis of the distributor chamber 6 and are uniformly distributed over its periphery, so that the diffusors are arranged in star formation. There is connected to each diffusor 17 a conveyor line 1 into which the propellant gas stream issuing from the diffusor nozzle 2 conveys the pulverous material fed through the outlet 4 as powder mixture 15. Concentrically to the diffusor nozzle 2, there is arranged an annular slot nozzle 13, which may be fed via a regulating valve 11 with propellant gas, for example compressed air, from a pressure tank 14 and serves to clean the conveyor means quickly and reliably, for example when the material is changed. A control aperture is arranged in front of the nozzle 2 in the area of greatest vacuum. A tube or pipe connection 7 is connected to the control aperture. At its front end, the tube 7 carries a control nozzle 8. As may be seen particularly from FIG. 1, the axis of the tube 7 is inclined at an acute angle with respect to the axis of the distributor chamber 6. The tube 7 surrounds an antechamber 7a, which has a cross-sectional area greater than the cross-sectional area of flow of the nozzle 8. The propellent gas is fed from the pressure tank 14 via a regulating valve 11 and a throttle 10 on the one hand to the diffusor nozzle 2 and on the other hand via a regulating valve 9 to the control nozzle 8.

The throttle 10 prevents an unlimited flow of the propellent gas, so that by means of the regulating valve 9 the propellent gas stream is regulated not only by the diffusor nozzle 2 but also by the control nozzle 8, and the intensities of the two gas streams are placed in two-way relationship with respect to one another. The two regulating valves 9 and 11 are coupled together by a drive (not shown in the drawing), so that one button can control the conveying capacity in optimum manner. The pressure and flow conditions in the vacuum chamber 3 located in front of the diffusor nozzle are such that the pulverous material in the region of the mouth of the inlet 4 is loosened.

The propellant gas stream necessary for maximum power conveying is a function not only of the conveyor equipment, such as desired conveyor equipment, desired conveyor capacity, length and diameter of the conveyor lead etc., but also of the nature of the material to be conveyed. The construction of the diffusor nozzle 2, the dimensioning of the throttle 10, the choice of the diameter for the inlets 4 and the distribution chamber 6 are made substantially in accordance with the desired operational data of the equipment and are appropriately selected for each type of equipment. It has been shown that in the conveying of different types of materials, the construction and dimensioning of the outlet aperture 19 of the diffusor has a considerable influence on the conveying capacity. In order to obtain optimum conveying capacities, sleeves 18 are provided which are insertable in the outlet aperture 19. The material of the sleeves 18, their length and their internal diameter are a function of the nature of the material to be conveyed. The individual most appropriate sleeve material may be ascertained from the physical and chemical properties of the conveyed material, the internal diameter and the length of the sleeve are most simply fixed empirically by experiments. The sleeves 18 may for example be clamped in the outlet aperture of the diffuser by a knurled-head screw 20.

The control gas stream is determined by the propellent gas stream and consequently has a similar dependency on the dimensioning of the equipment and the nature of the conveyed material as the latter. Decisive values for the control gas stream are, apart from the gas pressure which is determined by the regulating valve 9 and the throttle 10, the construction of the control nozzle 8, the measurements of the antechamber 7a and the angle of incidence of its axis with respect to the axis of the distributor chamber 6 or with respect to the axis of the inlet aperture 4. It is generally sufficient if these values are chosen for a certain equipment. In particular cases, the variety in the conveyed material may be taken into account by a variable length of the antechamber 7a, the control nozzle 8 for example being shiftably arranged in the tube 7.

The individual diffusors 17 are securable to the hopper or its distributor 6 by suitable means, the securing means preferably being so constructed that each diffusor is rotatable about an axis which is vertical with respect to the axis of the distributor, and may be located in a suitable position. This makes possible a great adaptability of the conveyor means to any existing powder-spraying apparatus. Corresponding to the actual requirements, more or fewer diffusors may be connected to one and the same hopper. The conveying capacity of each individual diffusor is hereby adjustable from its maximum value to zero with no mutual interferences occurring. As described above, the conveying capacity for each diffusor is set by actuating a single setting device. After the pressure and flow conditions in the vacuum chamber 3 have been correctly set, each diffusor of the conveyor means delivers a homogeneous mixture of powder and gas without powder agglomerates or formation of lumps.

I claim:

1. A pneumatic conveyor system, particularly for powder-spraying apparatus in which powder material is supplied from a loading hopper and blown through the conveyor line by means of a propellent gas stream fed into the line by diffusor means, and which comprises an inlet duct arranged to supply material from said loading hopper into said conveyor line and opening into said diffusor means at a region of substantial vacuum, a second duct also opening into said diffusor means at said region of substantial vacuum and arranged to supply an additional control gas stream into said region, and means for controlling the supply of control gas through said second duct, wherein the improvement comprises a distributor chamber forming the lower end of said loading hopper, a plurality of diffusor means communicating with said distributor chamber, and a separate conveyor line connected to each diffusor means, said second duct being connected with the respective diffusor means by a pipe connection having its axis inclined with respect to the axis of said inlet duct from the distributor chamber to the diffusor means at an angle of less than 90°.

2. The system as claimed in claim 1, in which said pipe connection to each diffusor means is provided at its outer end with a control nozzle.

3. The system as claimed in claim 2, in which said control nozzle is movable along said pipe connection.

4. The system as claimed in claim 2, in which said diffusor means include a diffusor nozzle which is concentrically surrounded by an annular slot nozzle.

5. The system as claimed in claim 1, in which the outlet from said diffusor means into the respective conveyor line is provided with an interchangeable sleeve.

6. The system as claimed in claim 1, in which the inlet duct from said distributor chamber to each diffusor means is directed at right angles to the axis of the distributor chamber.

7. The system as claimed in claim 5, in which said plurality of diffusor means are arranged in star formation on the distributor chamber.

8. The system as claimed in claim 4, in which the control nozzle of said pipe connection between said second duct and the diffusor means is connected by the intermediary of a first regulating valve to throttling means in the feed line of said propellent gas stream and said diffusor nozzle is directly connected to said throttling means, said regulating valve and throttling means serving to adjust pressure and flow conditions in said region of substantial vacuum in the diffusor means and to loosen the powder entering into the diffusor means through said inlet duct.

9. The system as claimed in claim 8, in which said throttling means is connected by a second regulating valve to a source of propellent gas and means are provided for simultaneous control of both said regulating valves.